United States Patent [19]
Keller et al.

[11] Patent Number: 5,509,948
[45] Date of Patent: Apr. 23, 1996

[54] DISPOSABLE TWO-STAGE AIR CLEANER

[75] Inventors: Dennis B. Keller, Salem; Donald R. Denton, Chagrin Falls, both of Ohio

[73] Assignee: Air-Maze Corporation, Stow, Ohio

[21] Appl. No.: 238,913

[22] Filed: May 6, 1994

[51] Int. Cl.⁶ .................................................. B01D 50/00
[52] U.S. Cl. ....................... 55/337; 55/394; 55/423; 55/426; 95/268
[58] Field of Search ........................ 55/320, 337, 394, 55/395, 423, 426, 429, 431, 466, 330, DIG. 34; 95/268

[56] References Cited

U.S. PATENT DOCUMENTS

| | | | |
|---|---|---|---|
| 1,760,705 | 5/1930 | Ludlam | 55/426 |
| 1,854,010 | 4/1932 | Woodford | 55/431 |
| 1,864,201 | 6/1932 | Kegerreis et al. | 55/426 |
| 3,876,400 | 4/1975 | Frantz | 55/423 |
| 3,898,064 | 8/1975 | Tao et al. | 55/337 |
| 3,928,007 | 12/1975 | Jackson | 55/337 |
| 4,217,118 | 8/1980 | Kopf et al. | 55/337 |
| 4,261,710 | 4/1981 | Sullivan | 55/337 |
| 4,350,509 | 9/1982 | Alseth et al. | 55/337 |

FOREIGN PATENT DOCUMENTS 849950 7/1952 Germany ........................ 55/426

OTHER PUBLICATIONS

Air Maze Centrimaze Two-stage dry-type air filters: Series 10 and 12, ©1993 Air Maze.

*Primary Examiner*—C. Scott Bushey
*Attorney, Agent, or Firm*—Rankin, Hill, Lewis & Clark

[57] ABSTRACT

A disposable two-stage air cleaner includes a housing forming an air inlet, a separation chamber, a dirt collection chamber, and an air outlet. A filter element is located between the separation chamber and the air outlet. The air inlet moves the air in a circular pattern in the separation chamber, whereby dirt is thrown outwardly by centrifugal force. An air scavenging system is employed in which air laden with dirt from the first-stage separation chamber is scooped into the dirt collection chamber and air from the dirt collection chamber is allowed to recirculate into the separation chamber after the air flow has been slowed so that the dirt falls from the air stream. The air cleaner thus provides performance which is equal to or better than reusable air cleaners of the prior art.

5 Claims, 2 Drawing Sheets

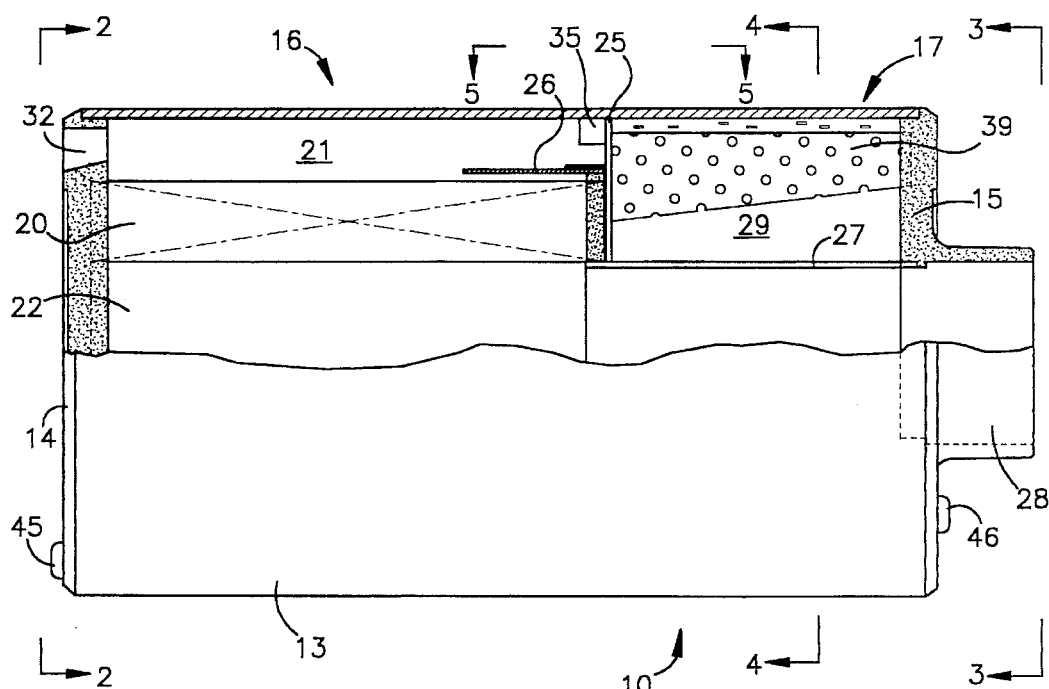
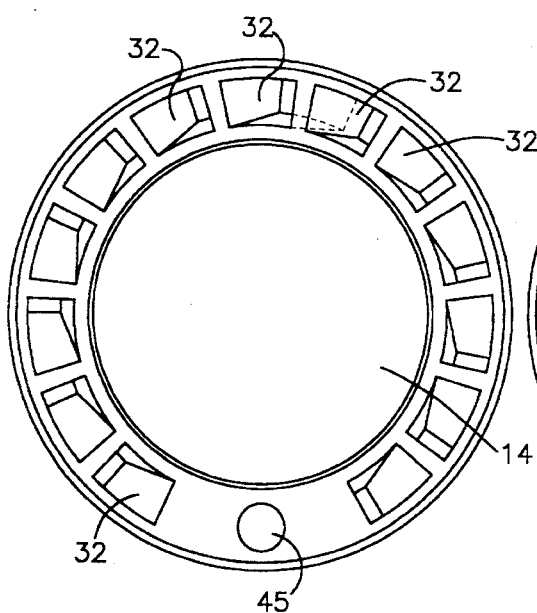
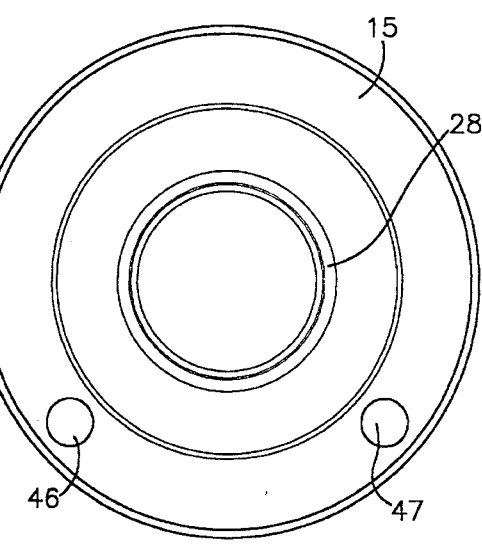
Fig.1
Fig.2
Fig.3

DISPOSABLE TWO-STAGE AIR CLEANER

BACKGROUND OF THE INVENTION

1. Field of the Invention

This invention relates to air cleaners, and particularly to two-stage air cleaners having a cyclonic first-stage air separator and a second-stage filtering element.

2. Description of the Prior Art

Two-stage air cleaners are commonly used to clean air used in combustion engines and for other purposes. The air cleaner typically includes a first stage in which dirt is removed from the air by centrifugal force by rotating the air in a cyclone. The air cleaner also includes a second stage in the form of a filter element to remove dirt not separated by the cyclone.

The dirt removed by the cyclone accumulates in a separate location or chamber in the air cleaner. If the air cleaner becomes filled with dirt, it will no longer function, so some provision must be made for the periodic removal of dirt collected in the air cleaner. Typically, this is accomplished using a removable end cap or some other access to the dirt collection chamber. The provision of an effective access is difficult and adds to the cost of the cleaner. In addition, the access must be sealed to the air cleaner housing, and these seals may be subject to leakage as they wear or become misaligned. Furthermore, the provision of such an access provides no assurance that the air cleaner will be properly maintained and that the dirt collection chamber will be regularly emptied. To avoid the necessity of periodically emptying the air cleaner, some air cleaners are provided with automatic dirt unloaders. The automatic dirt unloader is essentially a one-way valve which allows dirt to exit the collection chamber but prevents air from being sucked into the chamber. However, the automatic dirt unloader must be inspected periodically to make sure that it is working properly. Even in the best of circumstances the valve usually leaks to some degree, allowing air to back flow into the collection chamber and dispersing dirt into the air cleaner.

To avoid dirt removal as well as the replacement of filter elements, disposable air cleaners have been developed. An example of a disposable air cleaner is shown in U.S. Pat. No. 4,350,509, issued to Alseth et al. This air cleaner provides an air cleaner made of lightweight, inexpensive and disposable materials, but it has limited capacity for holding dirt. In one embodiment, the air cleaner in U.S. Pat. No. 4,350,509 has a dirt collection chamber within an end cap, but the end cap is removable. The removable end cap allows the user to clean the collection chamber, but it is also subject to all of the problems of removable access doors of the prior art.

SUMMARY OF THE INVENTION

The present invention provides a unique design for a two-stage air cleaner which provides advantages not realized heretofore. The design is especially adapted for use in a disposable air cleaner in which the entire air cleaner is made of disposable materials and can be discarded when the dirt collection chamber is filled, so that the dirt collection chamber need not be emptied and the filter element need not be replaced.

The air cleaner of the present invention provides an active closed-circuit air scavenging system in which air laden with dirt from the first-stage separation chamber is scooped into the dirt collection chamber and air from the dirt collection chamber is allowed to recirculate into the separation chamber after the dirt has been removed or extracted by various means from the air stream. The air cleaner thus provides performance which is equal to or better than reusable air cleaners of the prior art.

The invention provides a sealed dirt collection chamber which avoids the problems associated with automatic dirt unloaders or removable end caps. The air cleaner is simply disposed of when the dirt collection chamber becomes full, avoiding the requirement for periodic maintenance.

By making the air cleaner using inexpensive, disposable materials, the air cleaner can be manufactured and sold at a lower cost to customers, making it competitive with reusable air cleaners that requirement maintenance expenses.

The air cleaner of the present invention may also be provided with a unique mounting arrangement which assures that the air cleaner will be mounted in the preferred mounting position. The end caps may have mounting buttons which fit into corresponding openings in a mounting bracket. The location of the mounting buttons assures that the air cleaner will be positioned correctly. The removal of the air cleaner from the bracket and the replacement of a new air cleaner can be accomplished without tools, providing quick and easy replacement of the air cleaner.

These and other advantages are provided by the present invention of an air cleaner which comprises a housing including a separation chamber, an air inlet to the separation chamber, a dirt collection chamber, and an air outlet. Filter means are located between the separation chamber and the air outlet. Means associated with the air inlet move the air in a circular pattern in the separation chamber, whereby dirt is thrown outwardly by centrifugal force. The air scavenging means includes means for withdrawing dirt laden air from the separation chamber into a dirt collection chamber, means for slowing the velocity of the dirt laden air in the dirt collection chamber to allow dirt to fall from the air, and means for allowing air in the dirt collection chamber to exit back to the air separation chamber.

BRIEF DESCRIPTION OF THE DRAWINGS

FIG. 1 is a side elevational view, partially sectioned, showing the air cleaner of the present invention.

FIG. 2 is a end elevational view of the air cleaner taken along line 2—2 of FIG. 1.

FIG. 3 is an opposite end elevational view of the air cleaner taken along line 3—3 of FIG. 1.

DETAILED DESCRIPTION OF THE PREFERRED EMBODIMENT

Figure 4:
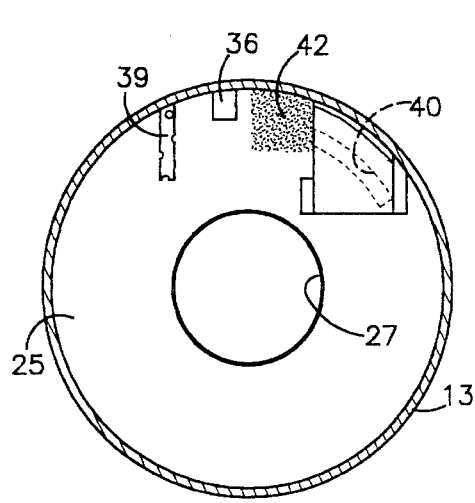
FIG. 4 is a cross sectional view taken along line 4—4 of FIG. 1.

Referring more particularly to the drawings and initially to FIG. 1, there is shown an air cleaner 10 according to the present invention. To assist in the description of the air cleaner 10, the inlet end of the air cleaner shown to the left in FIG. 1 will be described as the "front" of the air cleaner, and the outlet end of the air cleaner shown to the right in FIG. 1 will be described as the "rear" of the air cleaner.

The air cleaner 10 includes a housing formed of a cylindrical housing member 13, a front end cap 14, and a rear end cap 15. The air cleaner 10 comprises a front portion 16 and a rear portion 17.

The front portion 16 of the air cleaner includes a corrugated, cylindrical filter element 20. The filter element 20 may be, for example, pleated resin-impregnated cellulose paper filter, although other known filter elements may be employed. Many filter elements normally used in conventional two-stage air cleaners may be suitable for use in this air cleaner. While the filter elements in conventional air cleaners are replaceable, the filter element used herein is intended to be permanently mounted in a disposable air cleaner and, therefore, is not replaceable by itself.

A separation chamber 21 is formed around the outside the filter element 20 between the interior surface of the cylindrical housing member 13 and the filter element. Inside the filter element 20 and coaxial with the filter element, a porous cylindrical tube 22 may be provided. The porous tube 22 is formed of a cylindrical length of material having large perforations and provides a structural member through which air may freely flow.

The rear portion 17 of the air cleaner is separated from the front portion 16 by an O-shaped wall 25 which extends from the interior surface of the cylindrical housing member 13 to the tube 22. A baffle tube 26 extends from the wall 25 toward the front of the air cleaner and provides a cover for the rear portion of the filter element 20. A sealed nonporous outlet tube 27 extends from the porous tube 22 through the rear portion 17 to an outlet connection 28 formed in the rear end cap 15. A dirt holding chamber 29 is formed within the interior of the rear portion 17 inside the cylindrical housing member 13 on the rear side of the wall 25 and around the outside of the outlet tube 27.

Air enters the cleaner 10 through a plurality of inlet vents 32 (FIGS. 1 and 2) arranged in a circular pattern in the front end cap 14, and the air flows into the separation chamber 21. A flow director is formed by the inlet vents 32 which extend through the front end cap 14 at an angle with respect to the axis of the air cleaner 10, so that a swirl is imparted to the air as it enters the separation chamber 21. The inlet vents 32 are sized and angled so as to maintain a critical velocity and angle to induce the swirl to the inlet flow of air and still maintain a low inlet restriction. The swirl imparted to the inlet air flow by the vents 32 creates a cyclone effect in which centrifugal force causes heavier dirt particles entrained in the air to be forced to the interior wall of the cylindrical housing member 13. The air then travels across the separation chamber until it encounters the wall 25. The air turns and moves along the exterior surface of the baffle tube 26 in a turbulent flow. Eventually, the air reaches the filter element 20, and the air flows through the filter element and into the interior of the filter element where it enters the outlet tube 27 through the openings in the porous tube 22. The air exits the cleaner 10 through the outlet tube 27 and through a conventional hose which would be attached to the connection 28 on the rear end cap 15.

Another filter element or "safety" element may be added inside the filter element 20 to assure complete filtering of the air in accordance with known designs of two-stage air cleaners.

The dirt which has been forced to the interior wall of the cylindrical housing member 13 by the cyclonic movement of the air in the separation chamber 21 becomes entrained in a heavily dirt-laden air stream. This heavily dirt-laden air is swept along the interior surface of the cylindrical housing member 13 until it reaches the wall 25. At the wall, the heavily dirt-laden air encounters a first passage which includes a scoop 35 (FIGS. 1 and 5) formed adjacent to an opening 36 in the wall 25. The scoop 35 extends from the wall 25 into the separation chamber 21 near the interior surface of the cylindrical housing member 13, so that it catches most of the heavily dirt-laden air which is circulating around on the interior surface of the cylindrical housing member, and it directs the air through the opening 36 and into the dirt chamber 29. The baffle tube 26 covers the portion of the filter element 20 near the wall 25 and protects the filter element from this heavily dirt-laden air.

Figure 5:
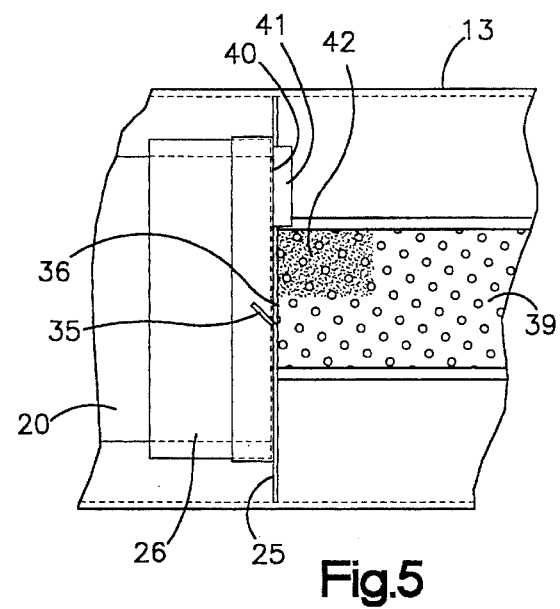
FIG. 5 is an elevational view taken along line 5—5 of FIG. 1 with the exterior portion of the housing member removed.

The heavily dirt-laden air enters the dirt holding chamber 29 at high velocity through the opening 36, and it is intentionally slowed by a flow retarder, such as a baffle member 39, which essentially acts as an air brake. A preferred baffle member 39 which is depicted in FIGS. 1 and 5 is a perforated paper cup member which extends across the upper portion of the dirt holding chamber 29 and which has a plurality of holes through which the air may flow. Other suitable baffle members may be used, such as a smaller corrugated bottomless paper cup member located around the opening 36. The perforated baffle member 39 slows the flow of air after the air flows through the opening 36, so that the dirt entrained in the air may fall from the air stream into the bottom of the dirt chamber 29. If additional slowing of the air is required, additional baffles can be added. After the air has been sufficiently slowed so that the entrained dirt has fallen from the air stream, the air leaves the dirt chamber 29 and returns to the separation chamber 21 through a second passage which includes a slot 40 formed in the wall 25. The slot 40 is located in the wall 25 adjacent to the baffle tube 26 and near the outer diameter of the filter element 20, so that the air exiting the dirt chamber 29 joins the cleaner air circulating through the separation chamber 21 and flows into the filter element 20. A chute 41 is formed over the slot 40 in the dirt chamber 29 to provide an additional baffle to slow the air flow in the dirt chamber and to prevent dirt from leaking from the dirt chamber when the chamber is filled. The chute 41 covers the slot 40 and is sealed on three sides and open at the top. The chute 41 requires the air leaving the dirt chamber 29 to flow to the uppermost portion of the dirt chamber 29 adjacent to the interior surface of the cylindrical housing member 13 before exiting the dirt chamber. To further slow the air flow in the dirt chamber and to prevent air from flowing directly from the opening 36 to the slot 40 in a short circuit, an air entrainment member 42 is positioned between the opening 36 and the slot 40. The air entrainment member 42 may be, for example, a layer of polyester batting material.

Various baffle means may be used as the air brake in the dirt chamber 29, and more baffles may be employed in addition to those shown in this preferred embodiment. The additional baffles would have the advantage of further slowing the air flow through the dirt chamber 29. However, the inclusion of more baffles may also interfere with the accumulation of dirt in the chamber 29, so additional baffles should be used sparingly. It has been found that the best manner of accomplishing both air braking and dirt accumulation is the use of the baffles such as that shown and described.

It will be appreciated that the air cleaner 10 of the present invention provides for air circulation or scavenging through the dirt chamber 29, so that dirt is conveyed in an air stream into the dirt chamber after being scooped through the opening 36, and, after the air flow has been slowed so that the dirt falls from the air stream, the air is allowed to return to the separation chamber 21 through the slot 40. The dirt chamber 29 is otherwise closed, and no other air enters the chamber. This design is particularly suitable for disposable air cleaners in which no provision made for opening the dirt chamber 29 to remove the dirt held in the chamber. With a disposable air cleaner, the air cleaner is simply discarded when the dirt chamber 29 becomes filled.

In order to maximize the amount of dirt that can be contained in the dirt chamber 29, it is important that the opening 36 and the slot 40 are both positioned near the top of the dirt chamber and near the top of the separation chamber 21 when the air cleaner is in a horizontal orientation as shown in FIG. 1. As shown in FIG. 5, the opening 36 and the slot 40 are both located near the upper vertical position of the wall 25 with each being offset from the very top location. In this manner, the position of the opening 36 and the position of the slot 40 are clear of dirt filling the chamber 29, and the chamber can be filled to its maximum volume without dirt leaking back through the openings.

Because the air cleaner is intended to be disposable, most of the elements of the air cleaner can be made of inexpensive materials such as cardboard and plastic. For example, the cylindrical housing member 13 can be made of a cardboard tube, and the end caps 14 and 15 can be made from inexpensive molded plastic.

The active closed-circuit air scavenging system in which air circulates through the dirt chamber 29 is specially adapted for use in this disposable air cleaner, but it should be appreciated that the principals of the air scavenge system can be adapted for use in a conventional reusable air cleaner. In such an adapted use, the advantages of using air to carry the dirt into the dirt chamber and returning the air to the air separation chamber will be realized.

The preferred mounting attitude of the air cleaner 10 is in a vertical orientation with the outlet connection 28 down. In this position, the opening 36 and the slot 40 are located at the top of the dirt collection chamber 29, maximizing the capacity of the chamber, and the dirt laden air in the separation chamber 21 flows downwardly to the scoop 35. A second preferred mounting attitude is horizontal, as shown generally in FIG. 1. However, if the air cleaner 10 is mounted in a horizontal orientation, the air cleaner must be positioned so that the opening 36 and the slot 40 are at the uppermost position, as shown in FIGS. 1 and 4.

Figures 6, 7:
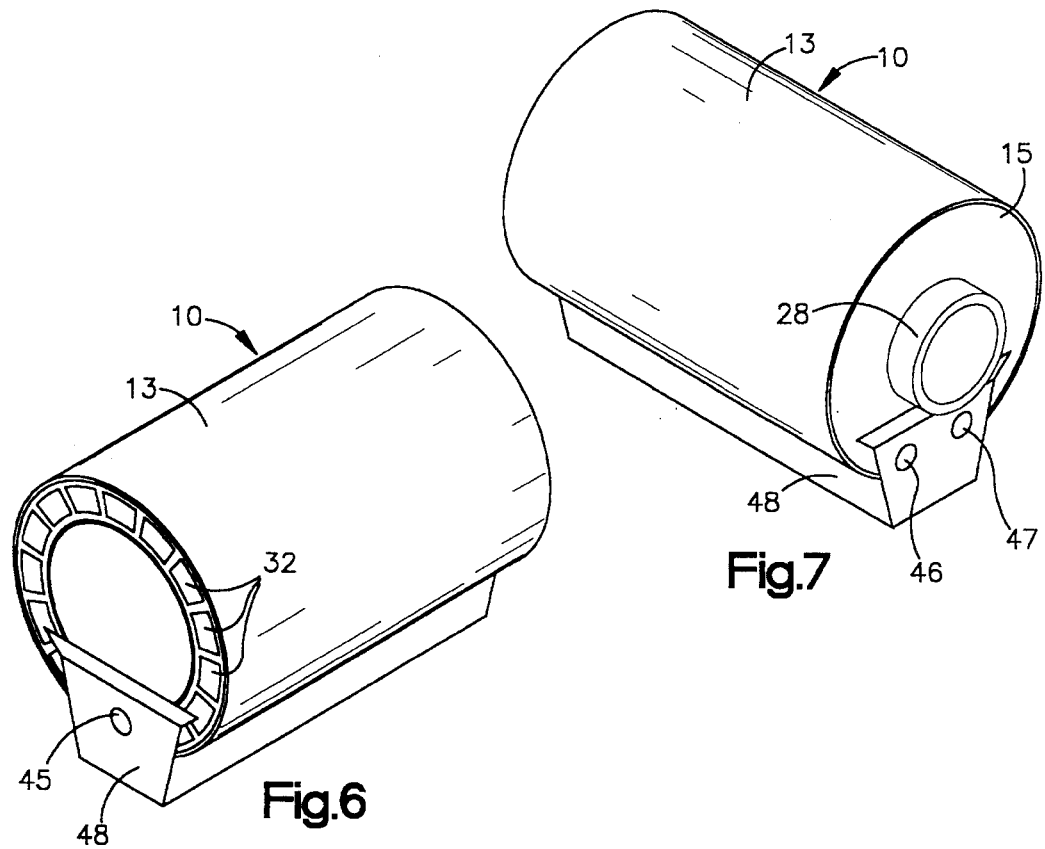
FIG. 6 is a perspective view of the air cleaner of FIG. 1 shown with a mounting bracket.
FIG. 7 is another perspective view of the air cleaner and mounting bracket of FIG. 6 taken from the other end.

To assist in properly mounting the air cleaner 10 in the proper orientation, mounting buttons may be located on the end caps. In the preferred embodiment shown, a single mounting button 45 is located at the bottom (or six o'clock position) on the front end cap 14, and two mounting buttons 46 and 47 are located near the bottom of the rear end cap 15. The mounting buttons 45, 46 and 47 fit within correspondingly arranged openings in a mounting bracket 48 (FIGS. 6 and 7). The mounting bracket 48 is arranged, for example on a engine, such that when the air cleaner 10 is mounted in the bracket the air cleaner is in the proper orientation. This assures that the opening 36 and the slot 40 will be located at the highest position and that the dirt holding chamber 29 can be filled to maximum capacity.

While the air cleaner 10 shown and described has an air inlet in which the air enters generally parallel to the axis of the cylindrical housing and has an air outlet in which the air exits at the opposite end from the inlet, other arrangements of inlets and outlets are possible without departing from the concepts of the invention. For example, the air inlet may be tangential to the cylindrical housing or the outlet may be at the same end of the air cleaner as the inlet. Air cleaners having various arrangements of air inlets and outlets are known in the art, and the concepts of this invention may be adapted to such arrangements.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is inconsistent with the extent to which the progress in the art has been advanced by the invention.

What is claimed is:

1. An air cleaner, which comprises:
   a housing including a separation chamber, an air inlet to the separation chamber, a dirt collection chamber, and an air outlet;
   a filter element between the separation chamber and the air outlet;
   a flow director associated with the air inlet for moving the air in a circular pattern in the separation chamber, whereby dirt is thrown outwardly by centrifugal force; and
   an air scavenging system including
      a first passage for withdrawing dirt laden air from the separation chamber into a dirt collection chamber,
      a flow retarder in the dirt collection chamber for slowing the velocity of the dirt laden air entering the dirt collection chamber through the first passage to allow dirt to fall from the air, and
      a second passage separate from the first passage and located in an annular zone spaced radially inward from said first passage for allowing air in the dirt collection chamber to exit back to the air separation chamber.

2. An air cleaner according to claim 1, wherein the housing is generally cylindrical and includes end caps.

3. An air cleaner according to claim 2, wherein the end caps have buttons thereon for mounting the air cleaner on a bracket.

4. An air cleaner according to claim 1, wherein the first passage includes a scoop extending into the air separation chamber in a radially outward position.

5. An air cleaner according to claim 1, wherein the flow retarder includes a baffle in the dirt collection chamber adjacent to the scavenging system.

\* \* \* \* \*